June 19, 1923.
A. E. MILLER
1,459,634
MEANS FOR PROTECTING NEGOTIABLE INSTRUMENTS
Filed Sept. 17, 1921
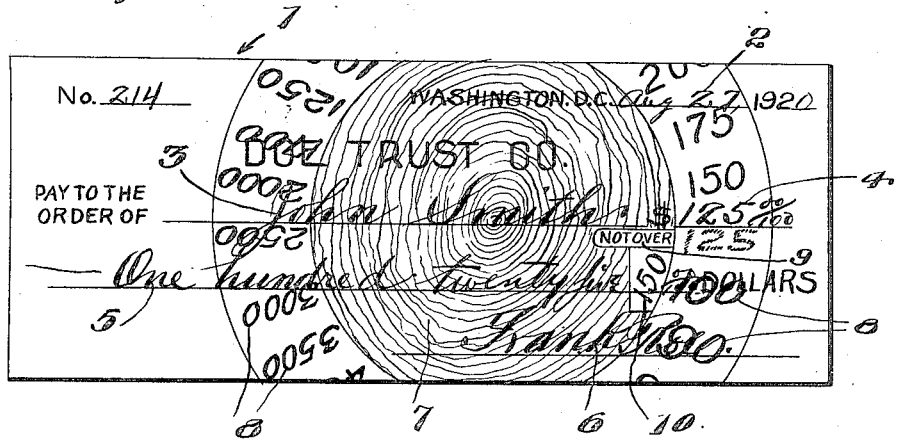
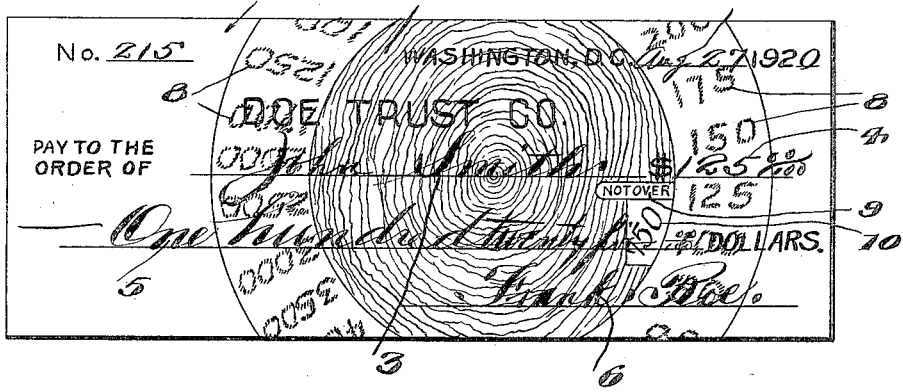
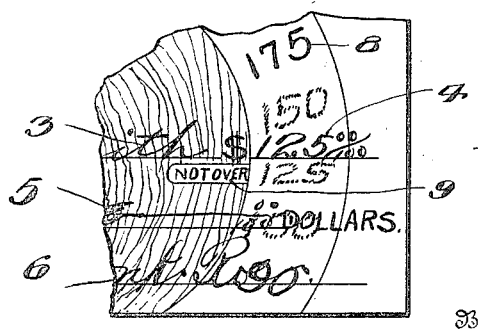
Inventor
Arthur E. Miller
By J. Walter Fowler
Attorney Patented June 19, 1923.

1,459,634

UNITED STATES PATENT OFFICE.

ARTHUR E. MILLER, OF SACRAMENTO, CALIFORNIA.

MEANS FOR PROTECTING NEGOTIABLE INSTRUMENTS.

Application filed September 17, 1921. Serial No. 501,226.

*To all whom it may concern:*

Be it known that I, ARTHUR E. MILLER, a citizen of the United States, residing at Sacramento, in the county of Sacramento and State of California, have invented certain new and useful Improvements in Means for Protecting Negotiable Instruments, of which the following is a specification.

The present invention relates to a means for protecting checks or other negotiable instruments, and is particularly an improvement upon the means shown and described in the application of Owen E. Sonne, Russell W. Proctor and myself, filed July 21, 1921, Serial Number 486,406, the object of the present invention being to provide additional safety means which will serve to prevent fraudulent alteration of the instrument, by providing the same with identifying marks which will indicate the value of the instrument, the marks being permanently impressed into the paper of the instrument.

In the drawings,

Fig. 1 is a plan view of a check showing one method for protecting the same against alteration;

Fig. 2 is a view of a check showing a modified method of protecting the same; and Fig. 3 is a fragmentary view of a second modified form of method.

It will be understood that the present means may be used upon negotiable instruments of any character, and the showing of the protection of a check in the present instance is merely for purposes of illustration. Referring to the drawings, the numeral 1 indicates, in the present instance, a check of ordinary form, having the usual printed matter thereon. Upon the face of the check when it has been drawn, appears the date, 2, the name of the drawee, 3, the amount for which the check is drawn in numerals, 4, the amount in words, 5, and the signature of the drawer of the check, 6. In order to give the utmost protection against fraudulent alteration of the check, it is important that the name of the drawee, the name of the drawer, and both forms of the amount should be covered by some protecting means which will prevent, not only their alteration, but also the removal of a portion of the check, and the substitution therefor of a new section containing different and fraudulent matter. It has been found in practice that dishonest persons have been able to avoid the protection given by the various forms of a check protection now in use, by cutting out a portion of the check, and substituting therefor a new portion containing different written or printed matter. In order to circumvent the actions of such persons, the method shown in the former application referred to above, was devised. While this is eminently satisfactory, I have found that it is possible to give an even better protection by the use of the present method in the event that the method described in the application noted above might not give full satisfaction.

The present invention consists in applying to and impressing upon the surface of the check a highly enlarged representation of a finger print; indicated by the numeral 7, which will be of a size that it will cover a portion or all of the date, the name of the drawee, the amount in figures, amount in words, and the signature of the drawer. This finger print is impressed upon the paper of the instrument by means of suitable dies, such for instance as those shown in the patent to Owen E. Sonne, Russell W. Proctor and myself, Number 1,411,892, dated April 4, 1922. Cooperating with the enlarged finger print I use a series of numerals impressed upon or into the check, one of said numerals being identified as controlling the true value of the check. In the present instance a series of numerals, 8, are impressed into the surface of the check, surrounding the impression of the finger print, the dies impressing the numerals being of larger diameter than the width of the check so that the numerals run outside of the edges of the check, only a portion of the numerals on the dies being impressed on the body of the check. The numerals may be arranged in any desired sequence, and may start at 1, or 10, and run to as high a figure as desired, either consecutively, or in any desired manner. Reference is again had to the patent to Messrs. Sonne, Proctor, and myself, for an impression stamp, noted above, which describes an instrument that is well adapted for the impression of both the finger print and the surrounding numerals it being understood that the die containing the numerals is preferably, though not necessarily, movable around the periphery of the finger print die, so as to bring a particular numeral opposite an indicating point, which in the present instance is shown as a line 9, which may be solid, which may surround the words "Not over," or which may comprise the words "Not over" alone, it being understood that the indicating mark, in whichever form it may be used, will be impressed into the paper, or printed upon the paper by a suitable inking device. The same result will be obtained if both the finger print die and the numeral die are movable in unison and are used in association with any fixed indicating mark. The indicating mark will serve to identify the numeral brought opposite it as controlling the true face value of the check. Still further protection is given by causing the serration of the numeral opposite the indicating mark, so that the fibers of the paper will be mutilated, the numeral thus serrated being not susceptible of any possible change. Many arrangements are possible to cause the serration of a numeral, and any such arrangement may be used as desired.

As a final protecting means, I use a personal identifying mark which is impressed into the check at any suitable point, in the present instance a number being impressed in the finger print portion of the check, as indicated by the numeral 10. This mark may be either a numeral or a symbol or design and will be individual to each person, and will be known to the bank on whom the check is drawn, so that if a dishonest person were to attempt to iron out the previous impressions and present a new impression on the check the alteration would be at once apparent should the person so altering the check impress the series of numerals in a different position than formerly, or attempt to change the numeral opposite the indicating point. Further, the impression of the identifying mark 10 into the check would cause it to be readily apparent if, on a new impression, any different mark were used in such place.

In the modified form of the invention shown in Fig. 2, all of the numerals surrounding the finger print are serrated or cut into the paper, it being understood that the serrations will be relatively minute, so that the face of the check is not unnecessarily mutilated. In Fig. 3, the numeral opposite the indicating point, and also the numeral on either side of this numeral are serrated, making it even more difficult to cause new numerals to be placed at this point without detection. By arranging the impression of both finger print and numerals so that a portion of both will extend outside of the top and bottom edges of the check, it is possible to cover all of the written matter on the check so that no part of it could be cut out and replaced by new matter without ready discovery, and furthermore, the use of a numeral die of large diameter will permit the placing thereon of a larger number of numerals with correspondingly smaller numerical lapses between them such as would be the case if the entire impression die was confined within the edges of the check. In Fig. 3 the identifying mark 9 is printed on the face of the check by suitable inking means, in any desired color, but this mark is arranged both as to size and position so as not to interfere with any of the original or written portion of the check.

No claim is made herein to the subject matter claimed in the application of Owen E. Sonne, Russell W. Proctor and myself, filed July 21, 1921, Ser. No. 486,406.

What I claim as new and desire to secure by Letters Patent is:—

1. A negotiable instrument having an enlarged arbitrary design impressed upon its surface, and a series of numerals surrounding and associated with said design, said design and associated numerals being of greater diameter than the width of the check and so disposed that they cover at least a portion of the name of the drawee, the amount in words, the amount in figures, and the signature of the drawer of the check.

2. A negotiable instrument having an enlarged arbitrary design impressed upon its surface and a series of numerals, one of said numerals being indicated as controlling the true face value of the check, and at least one of said numerals being serrated and cut into the surface of the check.

3. A negotiable instrument having an enlarged representation of a finger print impressed upon its surface, said finger print having a diameter at least equal to the width of the check and adapted to cover at least a portion of the name of the drawee, the amount in words and in figures, and the name of the drawer, a series of numerals associated with said finger print, one of said numerals being indicated as controlling the true face value of the check, and a mark adapted to be impressed into the check, said mark being individual to the drawer of the check and adapted as an identification of said drawer and the validity of the check.

In testimony whereof I hereunto affix my signature.

ARTHUR E. MILLER.